Patented Aug. 3, 1948

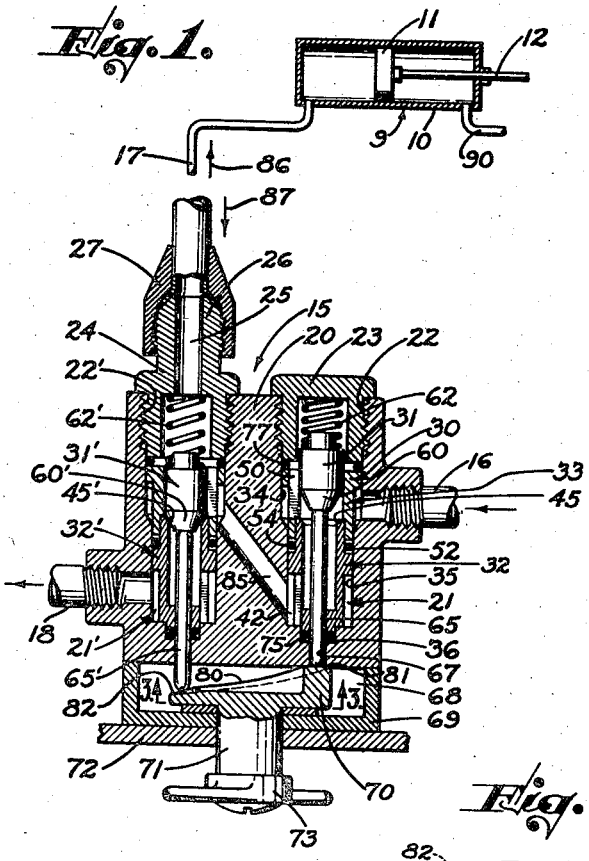

2,446,274

UNITED STATES PATENT OFFICE 2,446,274

VALVE

John N. Gladden, Glendale, Calif., assignor to Gladden Products Division of Los Angeles Turf Club, Inc., Glendale, Calif., a corporation of California Application August 23, 1943, Serial No. 499,617

9 Claims. (Cl. 251—167)

My invention relates to fluid-control valves and, more particularly, to a novel valve insert made wholly or in part of a molded plastic material.

The preferred embodiment of the valve includes a valve body with a ported chamber in which the valve insert or seat structure is removably inserted through a suitable opening, which is later closed in whole or in part by a cap or other closure means. Such a valve is often used alone or in conjunction with other valves for the control of hydraulic equipment on an aircraft and will be particularly exemplified with reference to the control of the cowl flaps of an airplane.

It has previously been proposed to associate the valve insert with the closure means in a unitary manner, the entire structure being formed of metal and being sealed with respect to the valve body by employment of suitable packing rings. One of the objects of the present invention is to provide a valve insert or seat structure separate from the closure means.

The previously-proposed unitary structure comprises an element difficult and costly to manufacture as it requires a multitude of machining operations and entails difficult assembly steps for installing a valve member resiliently engaging a seat of the unitary structure. It is an object of the present invention to provide a simple easily manufactured, quantity-producible valve insert overcoming these difficulties.

I have found it possible to use one or more valve elements formed of molded plastic material for the accurate control of fluid flow. In the preferred embodiment, both the valve seat and the face of the valve member cooperating therewith are molded-plastic-material surfaces. Tests have shown that these surfaces can be accurately molded and require no further machining, lapping, grinding, etc., and, further, that a plastic-material valve insert is very dependable in operation over long periods of time and can be used to control the flow of extremely-high-pressure fluids. The surfaces are not subject to corrosion and offer a slight amount of resiliency very desirable in insuring accurate seating of the valve member.

It is an object of the present invention to provide a valve having one or more valve elements formed of molded plastic material and preferably providing a valve surface formed during the molding operation.

Another object of the invention is to provide relatively movable members respectively providing a valve seat and a cooperating valve face, the seat or the face, or both, being formed of molded plastic material and the relative movement of the members being such that the seat and face come into pressural engagement through substantially longitudinal motion, as distinct from a rotary motion.

It is also an object of the present invention to provide a valve member and a seat member combined, if desired, with a guide member, one or all of such members being formed of molded plastic material.

Another object of the invention lies in the provision of a two-element insert or seat structure for a valve and to provide a simplified means for sealing the insert or seat structure with respect to the surrounding body and an operating member for the valve.

Other objects lie in the provision of novelly formed cage-like elements, such as a seat member and a guide member, of such shape as to permit molding or die-casting thereof.

Further objects and advantages of the invention will be evident to those skilled in the art from the following description of exemplary embodiments.

Referring to the drawing:

Figure 1 is a cross-sectional view of a dual valve assembly incorporating the preferred insert of the invention;

Figure 2 is an exploded view of the preferred valve insert and valve member, showing the shape of the valve elements formed of molded plastic material;

Figure 3 is a fragmentary sectional view taken on the line 3—3 of Figure 1;

Figure 4 shows an alternative embodiment of the valve insert of the invention;

Figure 5 is a sectional view of another embodiment of the invention; and

Figure 6 is an enlarged perspective view of the valve member of Figure 5.

I have chosen to illustrate the invention as applied to a dual valve assembly for controlling the flow of high-pressure fluid to control the movement of a servomotor or actuator 9 providing a cylinder 10 with a piston 11 movable therein and connected by a rod 12 with the cowl flaps of an airplane, not shown, or with other mechanism to be hydraulically actuated. A valve structure 15 serves, when in one position to deliver high-pressure fluid from a pressure line 16 to a pipe 17 to advance the piston 11 and rod 12 rightward and, when in another position, to discharge fluid from the pipe 17 to one portion of the return pipe 18 of the hydraulic system, thus permitting leftward movement of the piston 11 by fluid supplied to the right-hand side thereof by valve mechanism not shown in detail.

The valve structure 15 provides a valve body 20 providing chambers 21 and 21', each respectively having openings 22 and 22' communicating with one side of the valve body 20. A suitable closure means closes at least partially each of the openings 22 and 22'. As shown in Figure 1, an externally-threaded recessed head or plug 23 completely closes the chamber 21, while a similar recessed head fitting 24 closes the chamber 21', except for a passage 25 provided by a threaded nipple 26 connected by a fitting 27 to the pipe 17 in a manner well known in the art.

Removably positioned in the chamber 21 is an insert or seat structure 30 forming a first valve element, and a valve member 31 forming a second valve element. Such first and second valve elements cooperate in controlling the flow of the fluid, as will be hereinafter described.

The seat structure 30 is best shown in Figures 1 and 2 and comprises two cage-like insert elements hereinafter referred to, by way of explanation of the particular valve shown, as a seat member 32 and a guide member 33 adapted for assembly to form the first valve element of the preferred embodiment of the invention. As best shown in Figure 1, the chamber 21 provides an outer or enlarged portion 34 for the reception of a major portion of the guide member 33 and provides an inner portion 35 of reduced diameter for reception of the seat member 32. The extreme inner end of the chamber 21 provides a recess 36 into which a portion of the seat member 32 extends.

In the preferred embodiment of the invention, the valve member 31, the seat member 32, and the guide member 33 are each formed of molded plastic material. By the term "molded plastic material," I have reference to any of the thermoplastic or thermosetting plastics or resinous products formed by compression or injection molding and having properties similar to any of the various phenol condensation products, such, for example, as "Bakelite." A general-purpose plastic material or a shock-resistant plastic material can be employed in this connection, and a wide variety of moldable plastic materials is available. I have found "Bakelite" to be very satisfactory in the valve construction shown, although it should be clear that any of the various modern plastic materials can be employed with various degrees of success.

The seat member 32 is formed entirely of such plastic material, molded in the shape best shown at the bottom of Figure 2. It includes a lower ring 38 dimensioned for insertion in the recess 36 and providing an opening 39. Integral with and extending from the periphery of the lower ring 38 are four arms 40 spaced from each other to define a cage-like structure and to provide fluid-conducting spaces therebetween. The lower extremities of the arms 40 terminate intermediate the upper and lower faces of the lower ring 38 to provide a stop means limiting the movement of the ring 38 into the recess 36. The upper extremities of these arms are molded integrally with, and depend from, the lower surface of an upper ring 41, dimensioned externally to form a sliding fit in the inner portion 35 of the chamber 21. The inner surfaces of opposed arms 40 are separated by a distance substantially equal to the external diameter of the lower ring 38, and the outer surfaces of such arms are separated by a distance less than the diameter of the inner portion 35 of the chamber 21 so as to provide a peripheral chamber 42, best shown in Figure 1.

The upper ring 41 cooperates with a reduced-diameter neck 43 molded integrally therewith in defining a tubular portion of the seat member 32 providing a fluid-conducting passage 44 aligned with, but larger in diameter than, the opening 39. At the junction of the ring 41 and the reduced-diameter neck 43 is a radial shoulder 44a. A valve seat 45, preferably bevelled inward to be of frusto-conical shape, is provided at the extremity of the neck 43 and is preferably formed in the molding operation.

The guide member 33 is also molded integrally and includes a lower ring 46 of substantially the same external diameter as the upper ring 41 of the seat member 32 so that it can extend a distance into the inner portion 35 of the chamber 21, as shown in Figure 1. The inner diameter of the lower ring 46 is such as to telescope with the neck 43. Four arms 47 integrally connect the lower ring 46 with an upper ring 48 dimensioned for sliding insertion in the outer portion 34 of the chamber 21. The inner diameter of the upper ring 48 is substantially the same as the external diameter of the lower ring 46 so that the outer faces of the arms 47 comprise, in effect, extensions of the outer periphery of the lower ring 46 and are substantially in alignment with the inner periphery, indicated at 49, of the upper ring 48. These arms 47 are spaced from each other to define a cage-like structure and to provide fluid-conducting spaces therebetween.

The inner surfaces of the arms 47 may be flat or may be segments of a circle concentric with the axis of the upper ring 48. Such inner surfaces are spaced from each other to bound a guide passage extending toward the valve seat 45 and to provide guide surfaces for guiding the valve member 31 in its longitudinal movement toward and away from the seat 45. When the valve member 31 is disposed in the guide passage, arcuate passages 50 are provided between the inner periphery 49 and the outer periphery of the valve member 31, these arcuate passages traversing the upper ring 48 between the arms 47.

The distance between the inner surfaces of opposed arms 47 is also slightly less than the inner diameter of the lower ring 46, whereby the bottom of each arm 47 extends into the space within the lower ring 46 to define a stop shoulder 51 forming a stop means limiting the degree to which the seat member 32 and the guide member 33 may telescope. This stop means is engaged by the upper end of the neck 43 and is so disposed as to leave an annular groove 52 between the lower end face of the lower ring 46 and the radial shoulder 44a of the seat member 32. A sealing means is disposed in this annular groove 52, preferably a doughnut-like sealing ring 54 formed of rubber or other resilient material, and adapted to form a tight seal between the outer and inner portions 34 and 35 of the chamber 21 by pressural engagement with a wall of the portion 35. As shown, the annular groove 52 is preferably of a width greater than the sealing ring 54 but, if desired, it may be made of such width as to compress and expand the sealing ring.

The valve member 31 comprises an integrally molded member having a cylindrical body portion 58 with a molded tapering or conical face 60 adapted for engagement with the seat 45 to control the flow of fluid therebetween. The cylindrical body portion 58 is of such size as to slide longitudinally along the guide passage formed within the arms 47. This cylindrical body portion 58 provides an integral head 61 of somewhat smaller diameter. As best shown in Figure 1, a compression spring 62 slips over and is centered by this head 61 and extends into the recess of the removable head or plug 23. This spring urges the valve member 31 into resilient engagement with the seat 45. The slope of the conical face 60 may be equal to, greater than, or less than the slope of the mating valve seat 45. I prefer to make these slopes slightly different, as shown in Figure 1, thus providing for substantially line contact rather than surface contact between the face 60 and the seat 45.

The valve member 31 is displaced from the seat 45 to open the valve by pressure exerted through an operating member, shown as a plunger 65. The upper end of this plunger is rounded to engage a recessed lower surface of the valve member 31. The plunger passes through the opening 39 of the lower ring 38 and is thus journalled in its longitudinal movement. It extends also through an opening 67 of the valve body 20 into a chamber 68 provided by a cover 69, being actuated by rotation of a cam 70 integral with a shaft 71 extending from the cover 69 and through a panel 72. This shaft 71 is provided with a suitable knob or handle means 73 for manual turning of the cam.

In assembling the valve, a sealing means, such as a small rubber sealing ring 75, is disposed in the recess 36. The seat member 32 and the guide member 33 are then inserted, either separately or together, with the sealing ring 54 in place. A suitable sealing means in the form of a gasket or sealing ring 77 is then inserted and the plug 23 is screwed tightly in place. This compresses the ring 77 to form a tight seal between the guide member 33 and the plug 23 and valve body 20. Such movement of the plug 23 may also be utilized to compress the sealing ring 54 if this ring is suitably dimensioned to be deformed when the seat member 32 and the guide member 33 are telescoped to a position determined by the stop means. The lowermost ends of the arms 40 provide stop means for limiting the inward movement of the seat member 32 and, when this stop means engages the bottom wall of the chamber 21, the sealing ring 75 will be compressed to form a multi-purpose seal. In the first place, this sealing ring will effectively seal the seat member 32 and the valve body 20. It is also dimensioned to be compressed around and in sealing relationship with the plunger 65, while permitting sliding motion of this plunger under the action of the compression spring 62.

The valve insert in the adjacent chamber 21' may be formed identically with that previously described and is indicated by corresponding primed numbers. The compression spring 62' in this instance provides turns spaced from each other so that fluid may flow therethrough into and from the passage 25.

The arrangement of the two adjacent valves is such that one opens when the other closes and the cam 70 is designed with this in view. This cam provides a cam surface 80 having two diametrically opposed high spots 81 and two diametrically opposed low spots 82, as best shown in Figure 3. The axis of the shaft 71 is displaced from a line joining the plungers 65 and 65' so that the plungers 65 and 65' engage the cam surface 80 at quadrant positions. Correspondingly, and as shown in Figure 1, when the plunger 65 is on one of the high spots 81, the plunger 65' engages one of the low spots 82, and vice versa.

When the valve structure is in the position shown in Figure 1, high-pressure fluid flows from the pressure line 16 into the circular space around the arms 47, thence between these arms and between the now-separated valve face 60 and the valve seat 45. It then advances internally along the passage 44 through the neck 43 and the outer ring 41 and discharges between the arms 40 into the peripheral chamber 42. The valve body 20 provides an angled passage 85 which conducts this fluid to the circular space around the arms 47' of the other now-closed valve unit, whence it flows through the passage 25 and the pipe 17, as indicated by the arrow 86, to the left-hand cylinder of the servomotor to advance the piston 11 rightward. When the cam 70 is rotated through 90°, the valve member 31 will move by the action of spring 62 into engagement with the seat 45 to close off further flow of fluid from the pressure line 16. At the same time, the valve member 31' will be lifted from the seat 45' to open communication from the left-hand cylinder of the servomotor to the return line 18, the fluid flowing from the servomotor in the direction indicated by arrow 87 between the now-separated valve 60' and valve seat 45', thence through the seat member 32' to discharge between the arms thereof into the return line 18.

For purpose of clarity, I have shown in detail the fluid supply only for the left-hand cylinder of the servomotor. The right-hand cylinder thereof is conventionally controlled by pressure applied to and discharged from the right-hand side of the piston 11 through a pipe 90 corresponding to the pipe 17. The actuating fluid flowing through the pipe 90 is best controlled by a valve structure substantially identical with the valve structure 15 and operated by the same cam 70, the arrangement being such that, when fluid is supplied to one side of the piston, it is discharging from the other side, and vice versa. The manner of operating both valve structures from the same cam is suggested in Figure 3 and involves disposing corresponding plungers of the other valve structure in sliding engagement with the cam surface 80 at points indicated respectively by dotted lines 95 and 95'.

While I prefer to design the seat structure 30 so as to comprise two units, namely, the seat member 32 and the guide member 33, it is within the contemplation of the invention that these members should be formed integrally. Such a construction is suggested in Figure 4, in which a seat member 100 and a guide member 101 are formed of plastic material unitarily molded. In this embodiment, a groove 102 for reception of sealing ring 54 is molded in the periphery of the insert. Otherwise, the dimension relationships may be the same as previously described with reference to Figures 1 and 2 and a valve member 105, identical with the member 31 previously described, can be employed.

Another integrally formed seat structure is shown in Figure 5. Here, a valve body 109 includes intake and discharge ports 110 and 111 and provides a chamber including an outer portion 112 and an inner portion 113, respectively communicating with the ports 110 and 111. The insert or seat structure comprises unitarily formed guide and seat members 115 and 116, shouldered to provide a valve seat 117 which, if desired, may be relatively sharp or which can be of conical form similar to that previously described. The guide member 115 provides a plurality of peripheral openings 120 for communication between the port 110 and the zone above the valve seat 117, while the seat member 116 provides similar openings 121 for communication between the interior of this seat member and the discharge port 111. Sealing rings are provided, as previously described.

In Figures 5 and 6, the valve member is indicated by the numeral 125 and is guided in a cylindrical guide passage of the guide member 115, being urged resiliently downward by a spring 126 fitting in a depression 127 of the valve member. To prevent a piston action and to provide open communications between the upper and lower ends of the valve member 125, suitable flats 130 are formed thereon to permit flow of fluid transverse of the valve member during movement thereof. This valve member 125 provides a conical valve face 131 similar to that previously described, and is slightly recessed at its lower end to receive a plunger 132 bearing against a cam 133, as previously described.

In Figure 5, the valve is normally closed by the action of the spring 126. When opened, fluid may flow from the port 110 through the openings 120, thence between the valve face 131 and the valve seat 117, being discharged through openings 121 to the discharge port 111. The type of valve insert shown in Figure 5 can be employed in the embodiments of Figure 1 or it can be used merely as a single flow-control valve.

In all of the embodiments thus far described, the valve elements are formed of molded plastic material. This has been found particularly desirable, not only as expediting and decreasing the cost of production but also in forming valve elements capable of prolonged use under adverse conditions, even in the control of extremely high-pressure fluids. The type of valve construction shown is particularly applicable to the employment of molded-plastic-material valve elements. The valve member 31, for example, does not rotate in pressural contact with the seat 45, thus eliminating any tendency toward peripheral grooving and avoiding excess pressures which might be applied if the valve member were advanced by means turning in and threaded with respect to the valve body 20 or associated structure. In the preferred embodiment of the invention, the spring 62 limits the pressural force between the valve member and the seat member to a value which will not injure the molded surfaces. This spring acts as a biasing means tending to exert a maximum predetermined pressure between the valve member and the seat member, this pressure being sufficient to insure a fluid-tight seal in the zone of engagement but insufficient to crush or permanently substantially deform the molded-plastic-material surfaces.

While it is preferred that the entire valve insert, including the valve member and the seat structure, be formed of molded plastic material, the invention comprehends also either that only one of these elements may be formed of plastic material or that one or both of the contacting surfaces of the valve shall be formed of molded plastic material, whether the entire supporting structure for such surfaces is formed of plastic material or metal. Further, it is believed that the insert structure of the invention is novel irrespective of whether it is formed of plastic material or of metal. In the latter instance, and particularly if the elements are formed as suggested in Figure 2, they can be produced cheaply and in quantity by a metal die-casting process. In other instances, metal die castings can be employed with a minimum of machining operations.

The embodiments herein illustrated are by way of example and not by way of undue limitation. Various changes and modifications will be apparent to those skilled in the art from these exemplary showings and can be made without departing from the spirit of the invention as defined in the appended claims.

I claim as my invention:

1. A valve insert member formed entirely of molded plastic material and comprising a ring providing an end surface, a plurality of arms molded integrally with said ring and extending substantially parallel to each other from said end surface of said ring, and a second ring of larger diameter than the first-named ring and providing internal and external peripheral surfaces, said arms being molded integrally with the said internal peripheral surface of said second ring and extending radially inwardly therefrom.

2. A valve seat member formed entirely of molded plastic material and comprising a tubular portion providing end faces lying in planes perpendicular to the longitudinal axis of said tubular portion, one end face providing an annular molded-surface valve seat, a plurally of arms molded integrally with said tubular portion and extending from the other end face in a direction substantially parallel to said longitudinal axis, and an end member molded integrally with said arms at the extremities thereof, said arms traversing and extending outward from a portion of the periphery of said end member and said arms being spaced from each other to define fluid-conducting spaces therebetween.

3. In a valve, the combination of: a seat structure including a valve seat member having a valve seat, and including a guide means, said valve seat member including a tubular portion having said valve seat on one side thereof and having a plurality of longitudinal porting arms extending from the other side thereof, the guide means comprising a plurality of longitudinal guide arms cooperating in defining a guide passage extending toward said valve seat member on the same side thereof as said seat, said guide arms being circumferentially spaced from each other to define a fluid-conducting space longitudinally through said guide means and radially therefrom; and a valve member having a cylindrical side wall dimensioned for longitudinal movement in said guide passage toward and away from said valve seat and in engagement with said arms, said valve member having a valve face adapted to engage said valve seat.

4. In a valve, the combination of: a valve seat member having a tubular engaging portion and a neck portion of lesser external diameter extending therefrom with a valve seat at the end of said neck portion; guide means including a tubular member having a major bore adapted to telescope over said neck portion and a minor bore of lesser diameter than said major bore and forming an annular shoulder therebetween, said shoulder being adapted to engage said end of said neck portion to provide an external annular groove having side walls between the end of said tubular member and said tubular engaging portion; annular sealing means in said groove, said sealing means being of a size such that there is clearance between said sealing means and said side walls; and a valve member longitudinally movable in said guide means and guided thereby, said valve member having a valve face adapted to engage said valve seat.

5. In a valve, the combination of: a valve seat member having a tubular engaging portion and a neck portion of lesser external diameter extending therefrom with a valve seat at the end of said neck portion; guide means including a tubular member having a bore adapted to telescope over said neck portion, and having a plurality of circumferentially spaced longitudinal arms extending from said tubular member, said arms providing a longitudinal guideway therein, at least one of said arms projecting radially inwardly into the line of said bore to form a shoulder adapted to seat on said end of said neck portion; and a valve member longitudinally movable in said guideway and guided thereby, said valve member having a valve face adapted to engage said valve seat.

6. In a valve, the combination of: a valve seat member having a tubular engaging portion and a neck portion of lesser external diameter extending therefrom with a valve seat at the end of said neck portion; guide means including a tubular member having a bore adapted to telescope over said neck portion, and having a plurality of circumferentially spaced longitudinal arms extending from said tubular member, said arms providing a longitudinal guideway therein, at least one of said arms projecting radially inwardly into the line of said bore to form a shoulder adapted to seat on said end of said neck portion; an annular ring member disposed at the top of said arms, said ring member having an external diameter greater than said tubular member; and a valve member longitudinally movable in said guideway and guided thereby, said valve member having a valve face adapted to engage said valve seat.

7. In a valve, the combination of: a valve seat member having a tubular engaging portion and a neck portion of lesser external diameter extending therefrom with a valve seat at the end of said neck portion, said valve seat member also having a plurality of longitudinal porting arms extending from said tubular portion defining a fluid-conducting space therebetween; guide means including a tubular member having a bore adapted to telescope over said neck portion, and having a plurality of circumferentially spaced longitudinal arms extending from said tubular member, said arms providing a longitudinal guideway therein, at least one of said arms projecting radially inwardly into the line of said bore to form a shoulder adapted to seat on said end of said neck portion; and a valve member longitudinally movable in said guideway and guided thereby, said valve member having a valve face adapted to engage said valve seat.

8. A valve insert member comprising a first ring providing an end surface, a plurality of arms formed integrally with said ring and extending substantially parallel to each other from said end surface of said ring, and a second ring of larger diameter than said first ring and providing internal and external peripheral surfaces, said arms being formed integrally with said internal peripheral surface of said second ring and extending radially inwardly therefrom.

9. A valve seat member comprising a tubular portion providing end faces lying in planes substantially perpendicular to the longitudinal axis of said tubular portion, one end face providing an annular valve seat, a plurality of arms formed integrally with said tubular portion and extending from the other end face in a direction substantially parallel to said longitudinal axis, and an end member formed integrally with said arms at the extremities thereof, said arms traversing and extending outward from a portion of the periphery of said end member and said arms being spaced from each other to define fluid-conducting spaces therebetween.

JOHN N. GLADDEN.

REFERENCES CITED

The following references are of record in the file of this patent:

UNITED STATES PATENTS

| Number | Name | Date |
|---|---|---|
| 250,667 | Kennedy | Dec. 31, 1881 |
| 333,941 | Frisbie | Jan. 5, 1886 |
| 1,041,237 | Budlong | Oct. 15, 1912 |
| 1,068,909 | Langsdorff | July 9, 1913 |
| 2,019,257 | Gibbs | Oct. 29, 1935 |
| 2,069,297 | Abercrombie | Feb. 2, 1937 |
| 2,196,120 | Parker | Apr. 2, 1940 |
| 2,294,702 | Van Der Werff | Sept. 1, 1942 |
| 2,295,774 | Corydon | Sept. 15, 1942 |